DATA PROCESSING APPARATUS

Filed Jan. 4, 1954 3 Sheets-Sheet 1

INVENTORS.
ROBERT L. SINK
GLYN A. NEFF
BY James B. Christie
ATTORNEY

June 16, 1959 R. L. SINK ET AL 2,891,237

DATA PROCESSING APPARATUS

Filed Jan. 4, 1954 3 Sheets-Sheet 2

INVENTORS.
ROBERT L. SINK
GLYN A. NEFF

BY James B. Christie

ATTORNEY

DATA PROCESSING APPARATUS

INVENTORS.
ROBERT L. SINK
GLYN A. NEFF

BY James B. Christie

ATTORNEY

United States Patent Office
2,891,237
Patented June 16, 1959

2,891,237

DATA PROCESSING APPARATUS

Robert L. Sink, Altadena, and Glyn A. Neff, Pasadena, Calif., assignors, by mesne assignments, to Consolidated Electrodynamics Corporation, Pasadena, Calif., a corporation of California Application January 4, 1954, Serial No. 402,126
9 Claims. (Cl. 340—174)

This invention relates to improved apparatus for registering information occurring sequentially in time and more particularly, to improved apparatus for converting digital information appearing sequentially in time to digital information occurring or available for use substantially simultaneously.

In engineering process control, as well as in other applications, information appearing continuously, as for example a example a varying voltage, may be converted into digital form at selected times. The conversion from a continuously varying quantity to sequentially occurring digital information is sometimes termed analogue-to-digital conversion, a suitable system for which is shown and described in the co-pending United States patent application entitled "Analogue-Digital Converter," Serial No. 241,320, filed August 10, 1951, in the name of R. L. Sink, now Patent No. 2,775,754.

To reduce digital information to a useful form, various computations involving the digital information and selected constants may be performed by digital computing machinery. One method of inserting digital information in a digital computer is to use punched cards, each of which provides storage of a quantity of digital information in a coded form.

However, conventional card punching apparatus is ordinarily arranged to punch a card row by row, thereby perforating all of the positions in which a "1" occurs in a single operation, all positions in which a "2" occurs in a next operation, etc. Therefore, signals representing digital information which appears digit after digit in time sequence cannot be used directly to operate a conventional card punch.

The present invention provides apparatus for registering a quantity of time sequence digital information. This process is sometimes termed conversion of time-series information to time-parallel information. Although the present invention is described with respect to a system for discontinuously registering time-series information occurring during a predetermined interval, it will be appreciated that the principles of the present invention may be used to convert time-series information to essentially time-parallel information continuously. One application of the present invention is to convert binary-coded-decimal digits occurring digit after digit in time-sequence to punched card form wherein a quantity of information is registered on a single punched card.

In addition, the invention provides means for temporarily storing coded representations of digital values until such time as external apparatus is ready to utilize one or more of the stored digits having particular values.

In one embodiment of the present invention, digital information occurring sequentially in time is stored in a storage means; an output register is coupled to the storage means whereby selected portions of the output register are sequentially energized in accordance with selected portions of the storage means, and coincidence means is coupled between the storage means and the output register whereby the output register is caused to indicate the location of digits appearing in the storage means. In one particular embodiment, binary-coded-decimal digits are recorded around a magnetic drum, a storage register is commutated in sequence with the position of the magnetic drum, and a coincidence circuit energizes portions of the storage register corresponding to the location of selected ones of the digits recorded on the magnetic drum. One of the features of this particular embodiment is to convert binary-coded-decimal information to straight decimal information in the output register. The output register may comprise discontinuously operated card punches for registering a quantity of information in the form of punched cards.

These and other features of the present invention will become apparent upon a reading of the specification in connection with the drawings in which.

Figure 1:
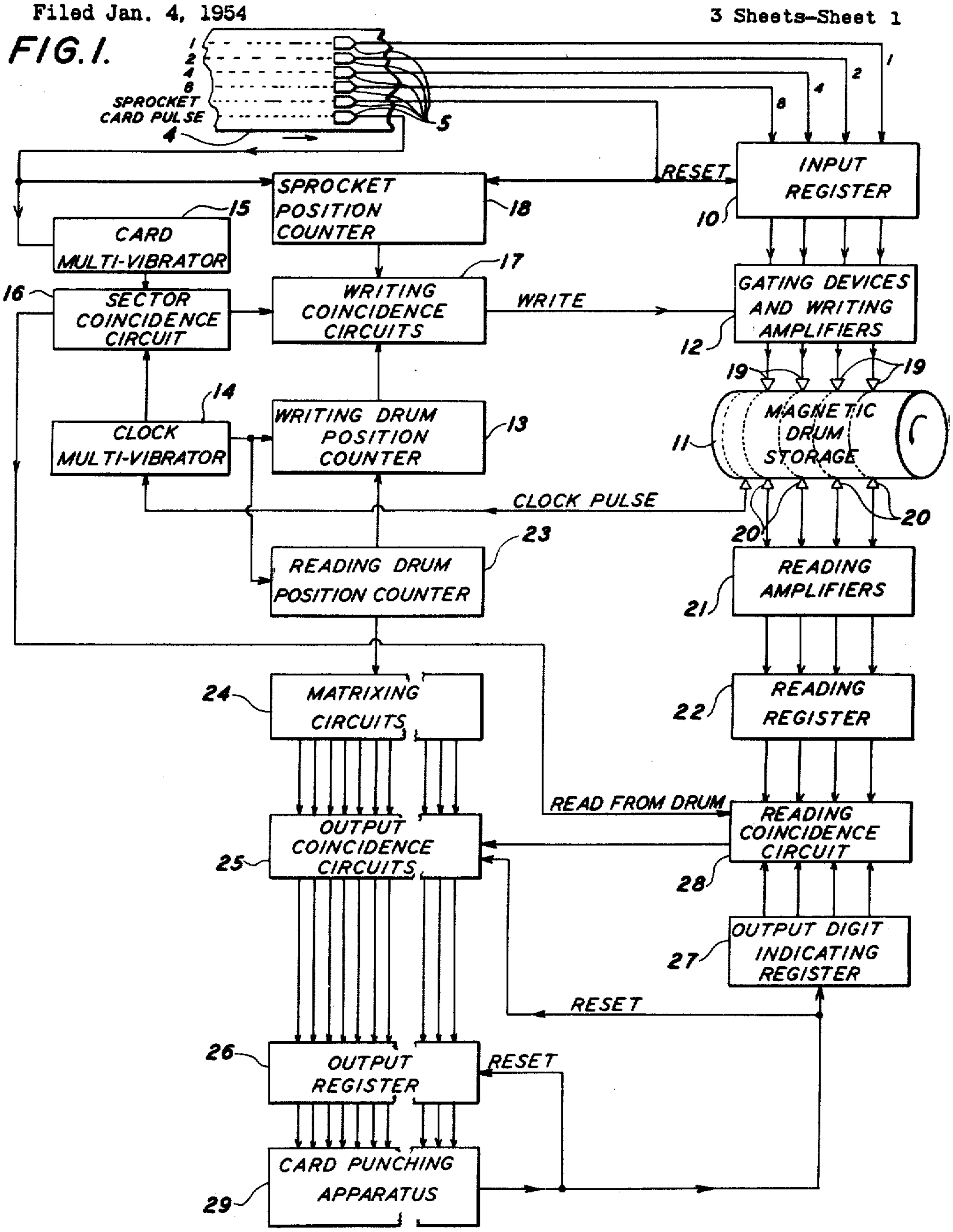
Fig. 1 is a block diagram including an illustrative embodiment of the present invention.

Turning to Fig. 1 in detail, a source of binary-coded-decimal information occurring digit-after-digit in time-series is provided by a previously recorded magnetic tape 4 having four tracks corresponding to the conventional 1, 2, 4 and 8 mode of binary-coded-decimal notation. An additional track provides a timing pulse which occurs coincident in time with each of the binary-coded-decimal digits.

Although the standard binary-coded-decimal system is used for purposes of description, it will be appreciated that any coded system may be used with corresponding changes in the comparison circuits.

Where the apparatus is to be employed for the purpose of storing a predetermined quantity of information, as for example in the form of a punched card, an additional track on the magnetic tape may be included as shown to provide a card pulse at the beginning and end of each predetermined quantity of information. The information appearing on the tracks of the magnetic tape may be derived by means of conventional magnetic pickup heads 5 and applied to the terminals of an input register 10. By means of the sprocket pulse from the timing track of the magnetic tape, the input register 10 is returned to zero following each binary-coded-decimal digit. The input register 10 may comprise a plurality of conventional bi-stable switching circuits, such as for example Eccles-Jordan multivibrator circuits, which are adapted to be energized into a given condition of operation in response to signals applied to the input register and which are adapted to be returned to an initial condition of operation by the sprocket pulses. Thus, the condition of the input register 10 indicates in time-sequence each of the binary-coded-decimal digits appearing on the magnetic tape. The binary-coded-decimal registrations appearing in the input register 10 may be placed in temporary magnetic drum storage 11 via the gating devices and writing amplifiers 12.

In the illustrative embodiment, a magnetic drum having four tracks for conventional binary-coded-decimal notation and a timing track for providing a clock pulse for each address or sector revolves at a relatively high rate, and the addresses or sectors on the magnetic drum 11 are indicated by means of a writing drum position counter 13 which is energized from the clock pulse track via a clock multivibrator 14. Although other modes of placing information on the magnetic drum 11 may be employed, a preferred mode is to interlace information on the surface of the magnetic drum where a punched card is the end result. The magnetic drum 11 would then carry the information corresponding to one punched card in one set of alternate sectors or addresses, and the information corresponding to a second punched card in alternate sectors lying between the first alternate sectors. By this means, information can be recorded on the magnetic drum 11 and read from the magnetic drum 11 at the same time, i.e., the information in one set of alternate sectors may be read-out while the other set of alternate sectors is recorded.

For selection of the sectors to be recorded, a card pulse from the magnetic tape is applied to a card multivibrator 15 which may be a conventional bi-stable switching circuit of the Eccles-Jordan variety which is adapted to be switched from one condition of operation to another condition of operation upon the arrival of each card pulse. The condition of the card multivibrator 15 is compared with a similarly constructed "clock" multivibrator 14 by means of the sector coincidence circuit 16. Since the clock pulses coincide with each sector of the magnetic drum 11, coincidence of the conditions of operation between the card multivibrator 15 and the clock multivibrator 14 will occur for every other clock pulse. This coincidence pulse enables the writing coincidence circuits 17 to establish coincidence between a given sector of the magnetic drum 11 as indicated by the writing drum position counter 13 and the sprocket position counter 18. Thus, a signal is provided by the writing coincidence circuits 17 when the magnetic drum 11 is suitably positioned for recording a digit in a particular sector of the magnetic drum 11. Therefore, the writing coincidence pulse from the writing coincidence circuits 17 is applied to the gating devices 12 so that the binary-coded-decimal digit appearing in the input register 10 at the instant of the writing coincidence pulse is transferred to the area of the magnetic drum 11 appearing under the recording heads 19. Upon the appearance of the next card pulse, the card multivibrator 15 is set to its other condition of operation and writing coincidence pulses will be provided by the sector coincidence circuit 16 for sectors of the magnetic drum 11 lying between those which were previously recorded. A description and explanation of the foregoing mode of interlaced magnetic drum recording may be found in the co-pending United States patent application of Glyn A. Neff, Serial No. 417,677, filed March 22, 1954, entitled Information Storage System.

The digital information appears on the magnetic drum 11 digit after digit in time sequence, although if the interlaced recording system of the aforementioned co-pending application is used, the digits of one block will be interspersed with the digits of another block of information. Since the magnetic drum rotates at a relatively fast rate, the serial information is presented to the magnetic pickup heads 20 at a rate which is many times more rapid than the rate at which the information is provided from the initial source, i.e. the magnetic tape 4. As will be discussed in detail below, a single block of information is passed to the magnetic pickup heads 20 a number of times so that the block of information may be scanned for the location of digits of a selected value. Thus, in essence the magnetic drum 11 provides an intermediate storage in which a block of information may be scanned a plurality of times.

The magnetic pickup heads 20 are adapted to derive the binary-coded-decimal digits recorded on the magnetic drum storage, and the reading amplifiers 21 are adapted to amplify each of these signals before they are applied to a reading register 22. The reading register 22 may be similar to the input register 10 in that it may comprise a plurality of bi-stable switching circuits, but does not require resetting where the mode of recording on the magnetic drum 11 is such that a positive magnetization represents one condition and a negative magnetization represents another condition. In this mode of recording both positive and negative signals are derived by means of the magnetic pickup heads 20. The reading register 22 is thus automatically reset without the aid of auxiliary reset pulses.

The reading drum position counter 23 is energized by clock pulses, so as to synchronously indicate the area of the magnetic drum 11 lying under the magnetic pickup heads 20 in contrast to the writing drum position counter 13 which is adapted to synchronously represent the area lying under the recording heads 19. Since the recording heads 19 and the magnetic pickup heads 20 are displaced radially around the periphery of the magnetic drum 11, the registration in the writing drum position counter 13 will be displaced from the registration in the reading drum position counter 23 by a number equal to the number of pairs of sectors occurring radially between the recording heads 19 and the magnetic pickup heads 20.

In one successful embodiment, the sprocket position counter 18 and the writing position counter 13 were constructed in conventional binary fashion. Where this is the case and where the binary counters 13 and 18 are adapted to count to a number greater than the number of digits to be recorded on the magnetic drum 11 in a single set of alternate sectors, the sprocket position counter 18 and the writing drum position counter 13 must be periodically reset to zero. This is accomplished in the case of sprocket position counter 18 by means of the card pulse derived from the magnetic tape and in the case of the writing drum position counter 13 by means of a pulse derived from the reading drum position counter 23 when the recording drum position counter is in a position corresponding to the numerical difference between the writing drum position counter 13 and reading drum position counter 23.

A conventional ring-type counter may be employed for the reading drum position counter 23. One or more ring-type counters may be coupled together so as to register the sector of the magnetic drum 11 appearing under the magnetic pickup heads 20 at any given instant. By suitable matrixing circuits 24, a signal is applied to each of a plurality of output coincidence circuits 25 in time-sequence corresponding to the registration in the reading drum position counter 23 and hence the corresponding sector of the magnetic drum 11 appearing under the magnetic pickup heads 20. Thus, the number of output coincidence circuits may correspond to a number of sectors of the magnetic drum, and hence to a predetermined quantity i.e. block of digital information which, in the case of cards would be, one card-full of information. Each of these output coincidence circuits may be coupled to an output register 26.

The output digit indicating register 27 is energized to indicate the value of the digits which are to be derived from the magnetic drum 11. When coincidence is achieved between the digit registered in the output digit indicating register 27 and a like digit in the reading register 22, and a reading pulse occurs from the sector coincidence circuit 16, the reading coincidence circuit 28 provides an output signal to the output coincidence circuits 25. As was previously noted, a signal from the matrixing circuits 24 is applied to one of the output coincidence circuits 25 corresponding to the sector of the drum 11 under the pickup heads 20, and when these signals occur simultaneously in a given coincidence circuit, a signal is provided on the output lead from that output coincidence circuit 25 for registration in the output register 26.

Thus, after a predetermined block of information has passed to the reading heads 20 there is provided a registration in the output register 26 corresponding to each drum position, i.e. sector in which the searched for digital value occurs.

Where it is desired to store the information in punched card form, each of the output leads from the output coincidence circuit 25 may be coupled to a relay which is in turn connected to an individual punch in a card punching apparatus 29. The card to be punched may have a number of "rows," each of which corresponds to a given digit. For example, a card may be arranged to have columns including spaces identified as 0—9. All of the like digits in all the columns would comprise a single row. The relays are locked in position for a period of time corresponding to the time required to punch a row on the card and the relays may be reset by means of a signal derived from the card punching apparatus 29 at the conclusion of a row punching operation.

It is the practice in certain commercially available punched card machines to so transport the cards through the machine that the card is punched row by row. The coding is such that the numerical value of each column in the same row is equal.

The output digit indicating register 27 accumulates a count supplied by the card punching apparatus 29. Each time the card is advanced one row, a count is added to the value in the register 27. Thus, the count in the register 27 represents the numerical value of the row in the card which is to be punched.

At the conclusion of the punch cycle of the machine for the "0" row of the card, the output digit indicating register 27 is energized for the numeral 1, and when coincidence is established between the reading register 22, the corresponding output coincidence circuit 25 of that particular column on a punched card is energized. Thus, the drum and the output coincidence circuits 25 are effectively scanned and the coincidence circuits 25 are energized in positions where the numeral 1 occurs in the originally stored data. The card punching apparatus then punches corresponding columns of the card in every position in which a numeral 1 appears and moves the card over to the row having a numerical code position of 2. At the end of the row punching operation a signal is provided for placing the output digit indicating register 27 in a condition representing the numeral 2. The operation is then repeated with respect to the numeral 2 and each successive numeral until a complete registration of the information occurring during a predetermined interval as determined by the card pulses takes place. It will be appreciated that information cannot be fed to the input register 10 faster than the card punching apparatus can receive the information. For this reason the magnetic tape apparatus may be run at a speed slightly slower than the card punching apparatus can handle the information, thereby insuring that no data is lost, or errors generated by changing the stored information on the drum before it has been transferred to the punched card.

Figure 2:
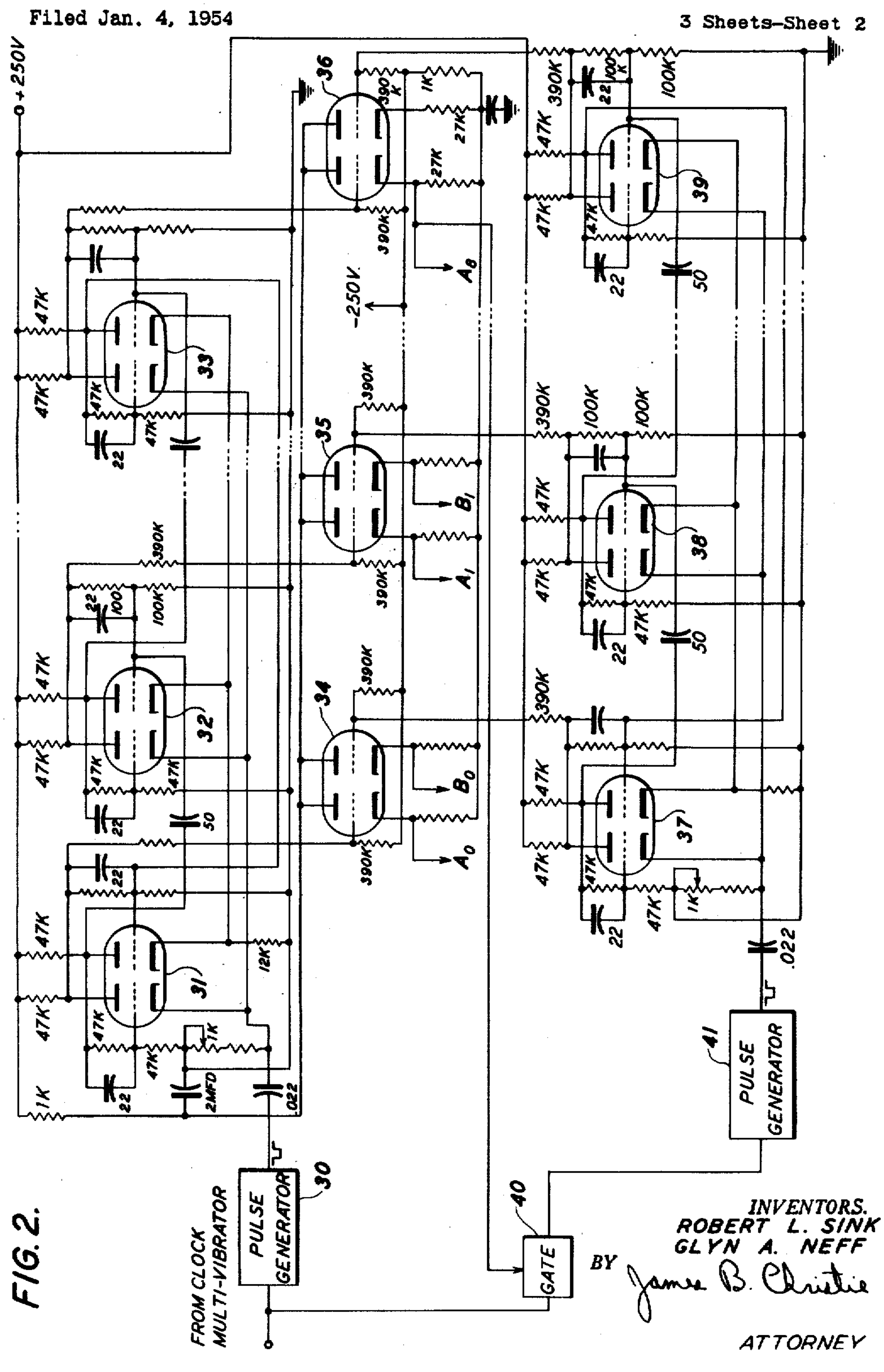
Fig. 2 is a schematic circuit diagram of that portion of the block diagram of Fig. 1 corresponding to the reading drum position counter.

Turning in detail to Fig. 2, a schematic circuit diagram is shown of that portion of Fig. 1 corresponding to the reading drum position counter 23. As indicated in Fig. 2, clock pulses from the clock multivibrator 14 of Fig. 1 are applied to a pulse generator 30 via an input terminal. The pulse generator is adapted to provide an output pulse of a desired wave shape in response to the clock multivibrator for driving a ring-type counting circuit. In this embodiment, the output pulses from the pulse generator 30 are employed to energize and shift the condition of operation of a ring counter by one step for each pulse. This is accomplished by applying these pulses to the cathodes of the electron tubes 31, 32 and 33. It will be noted that the connections between the electron tube 32 and the electron tube 33 are broken. This indicates that an additional number of sections identical to those shown may be included. Since ring-type counters are well-known in the art, no further explanation of the actual circuity is considered to be necessary, except to say that the particular ring-type counter employed may have nine stable states. In each of the stable states the output signal from a particular section may be applied to a cathode follower electron tube, as for example electron tubes 34, 35 and 36. Thus, when the ring counter is in one condition, a signal is supplied on lead $A_0$ and, when the next pulse is applied by the pulse generator 30, a signal appears in the lead $A_1$ across the cathode resistance of electron tube 35 and so on until the ninth stable state is reached when a signal appears on the lead $A_8$. At this time the sequence repeats itself starting with a signal on the lead $A_0$. The portion of the circuity thus far described will count from 0 to 8.

In order to achieve counts of higher numbers, an additional ring-type counter, including electron tubes 37, 38 and 39, is employed. When the ring counter of electron tubes 31, 32 and 33 reaches that state where a signal is supplied on a lead $A_8$, gate 40 is enabled to pass the next succeeding clock pulse applied to the terminal. This clock pulse may be reinforced by a pulse generator 41 and applied to the ring counter, including electron tubes 37, 38 and 39. As previously, additional sections may be included between electron tubes 38 and 39 so that the last named ring counter has a total of nine stable states. This means that the circuitry shown in Fig. 2 as a whole can achieve a total count of 81.

Each of the sections of the last named ring counter may be connected to a cathode follower output so as to provide a signal on lead $B_0$ when the counter is in one condition of operation and a signal on $B_1$ when the counter is in the next successive condition of operation and so on.

Through the use of the apparatus of Fig. 2, the sectors of the magnetic drum 11 of Fig. 1 lying under the reading pickup heads 20 may be identified by signals appearing on the various output leads.

Figure 3:
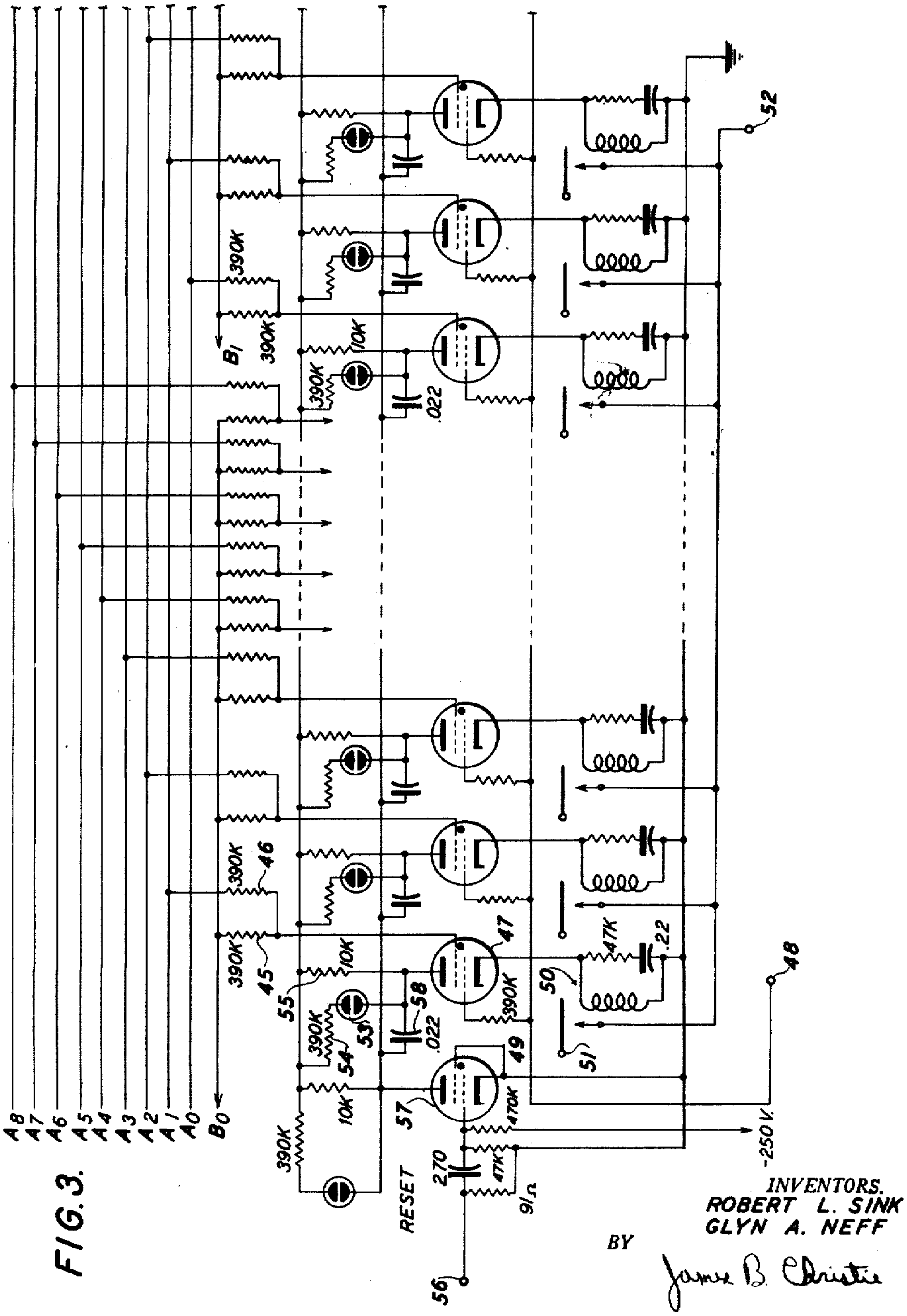
Fig. 3 is a schematic circuit diagram of that portion of Fig. 1 corresponding to the matrixing circuits, the output coincidence circuits and an output register adapted to operate in conjunction with card punching apparatus.

Referring to Fig. 3, the matrixing circuits 24 and coincidence circuits 25 along with one form of output register 26 of Fig. 1, particularly adapted for use in conjunction with card punching apparatus is shown. Each of the leads $A_0$ through $A_8$ may be connected to the corresponding lead shown in Fig. 2. For convenience only the matrixing circuits for the signal outputs from the circuity of Fig. 2 appearing on leads $B_0$ and a portion of $B_1$ have been shown in Fig. 3. Similar circuity may be employed for the rest of the matrixing circuits.

The matrixing circuits comprise a plurality of pairs of resistors which are connected so as to add algebraically the signals appearing on a selected pair of the leads. Thus, when the counter of Fig. 2 is in that condition of operation where a signal is supplied on the lead $B_0$ and the lead $A_1$, the resistors 45 and 46 effectively add these two signals and apply them to the screen grid of a suitable electron tube, such as a thyratron 47. The characteristics of thyratron tubes are suitable to provide a novel combination coincidence circuit and storage register. Although a summary discussion of this circuitry will be given here, a detailed explanation may be found in the co-pending United States patent application of Glyn A. Neff, Serial No. 407,346, filed February 1, 1954, entitled "Register for Digital Information." The signal provided by the reading coincidence circuit 28 of Fig. 1, when the information appearing in the reading register 22 corresponds to the selected information in the output digit indicating register 27, may be applied to a terminal 48 of Fig. 3 by means of a grid resistor 49 which is connected between the control grid of the thyratron 47 and the terminal 48. This coincidence signal is applied in like manner to all of the thyratrons. When a signal appears on the control grid of the thyratron 47 and the algebraic sum of the signals provided by means of the matrixing circuit, including the resistance 45 and 46, reaches a certain level, the thyratron 47 will be rendered conducting. As is well-known, no further change of potential on either the control electrode or the shield electrode will be sufficient to cut the electron tube 47 off. Thus, whenever such a coincidence is established, the thyratron 47 is capable of sensing this coincidence and registering an output signal for an indefinite period of time. It will be appreciated that the matrixing circuits effectively provide a commutation process in which each of the thyratrons is placed in a condition where a coincidence signal applied to the terminal 48 will render it conducting. The particular thyratron which is energized at any particular instant corresponds to that area of the magnetic drum 11 lying under the magnetic pickup heads 20 of Fig. 1. When any of the thyratrons is rendered conducting, a relay 50 connected in the cathode circuit is energized so as to close the contacts of the relay and effectively provide a closed circuit between the terminal 51 and the terminal 52. A gas discharge tube, such as a neon tube 53, may be connected serially with a resistance 54 in parallel with the load resistance 55 of the thyratron 47. These neon bulbs provide indicator lights and thus a visual registration of the thyratrons which are conducting and hence the sectors of the magnetic drum 11 which contain visual information corresponding to that selected and shown in the output digit indicating register 27. After a complete sequence, when all of the digital information being read from the magnetic drum 11 and corresponding to the selected value of the output digit indicating register 27 is registered in the apparatus of Fig. 3, the card punching apparatus may be energized in response to the particular relays which are closed so as to punch a row on a conventional punched card in the columns corresponding to the registration. At the end of the punching operation and in order to proceed to the next selected row and another selected value of information in the output digit indicating register 27, it is necessary to reset all of the thyratrons of Fig. 3. This is accomplished by applying a reset pulse to a terminal 56 and hence to the control electrode of a reset thyratron electron tube 57. This causes the anode of the reset electron tube 57 to go sufficiently negative so as to provide a signal at the anode of each of the thyratrons 47 via a suitable capacitance 58 to render the thyratrons 47 nonconducting. The apparatus is then in condition for another commutation process in which the information appearing in the reading register 22 corresponds to the information appearing in the output digit indicating register 27 in the apparatus of Fig. 3. In the embodiment of Fig. 1, the output digit indicating register 27 is a conventional binary counter and the punching pulse from the card punching apparatus is applied to the output digit indicating register 27 so as to cause the binary counter to assume its next successive condition of operation. Thus, for a complete registration on a conventional punched card having rows numbered from 0 to 9, the output digit indicating register 27 may be caused to provide a binary registration of the digits 0–9 in sequence so that row 0 of the card is punched first, row 1 of the card is punched second, and so on. The number of thyratron sections should be equal to the number of columns of the card in which information is to be recorded during any single punching operation. Although only a few of such stages have been shown in Fig. 3, it will be appreciated that any number of such identical stages may be employed in accordance with the number of sectors from which information is to be read. Thus, in one particular embodiment, a total of sixty-one columns of a punched card were devoted to the digital information supplied by sectors of the magnetic drum 11 and sixty-one separate thyratrons and relays were included to provide the registration and energization of the card punching apparatus.

We claim:

1. Apparatus for data processing including the combination of, a source of sequentially recurring digital information, a reading register coupled to said source for indicating said digital information a digit at a time in series sequence, a plurality of output coincidence circuits, means sequentially energizing said output coincidence circuits in synchronism with the sequencing of digital information appearing in said reading register, a reading coincidence means coupled to said reading register for providing an electrical signal when the digital information appearing in said reading register is equal to a predetermined value, and means coupling said reading coincidence circuit means to said output coincidence circuits whereby electrical signals are provided in selected ones of said output coincidence circuits when the digital information appearing in said reading register is equal to said predetermined value.

2. Apparatus for converting time-series digital information to time-parallel, including the combination of, a source of time-series digital information, means temporarily storing said time-series digital information in a recirculating storage device, a reading register coupled to said recirculating storage device for indicating a digit at a time in series sequence the digital information appearing in said storage means, a plurality of output coincidence circuits which are adapted to be sequentially energized in synchronism with said storage means, a reading coincidence circuit coupled between said reading register and said output coincidence circuits for providing an electrical signal at such times as the reading register indicates digital information equal to a predetermined value, and an output register coupled to said output coincidence circuits for registering digital information of said predetermined value for at least a period in time in which all of said output coincidence circuits are sequentially energized.

3. Apparatus for data processing including the combination of, a recirculating storage means having a plurality of sectors in each of which a digit may be recorded, a plurality of output coincidence circuits, each coincidence circuit producing an output signal in response to simultaneous energization of two inputs, means deriving the digits from said recirculating storage means in series sequence, means for successively energizing one of the inputs of the output coincidence circuits in synchronism with said recirculating storage means, whereby one input of each of said output coincidence circuits is energized for each of said plurality of sectors of the storage means, and means energizing all of the other inputs of said output coincidence circuits in response to said digit deriving means when the derived digit equals a predetermined value, whereby output signals are provided by selected output coincidence circuits according to the sector position and value of the digits stored in said recirculating storage means.

4. Apparatus for data processing including the combination of, a source of digital information, a recirculating storage means coupled to said source of digital information, said recirculating storage means having a plurality of sectors in each of which a digit may be recorded, a reading position counter coupled to said recirculating storage means for instantaneously indicating the position of said recirculating storage means, a reading register coupled to said recirculating storage means for deriving the digits from the sectors of said recirculating storage means, a plurality of output coincidence circuits, matrixing circuits coupled between said reading position counter and said output coincidence circuits for scanning said output coincidence circuits in synchonism with the position of said recirculating storage means, an output digit indicating register for determining the value of digital information to be derived from the recirculating storage means, a reading coincidence circuit coupled between said reading register and said output digit indicating register, means coupling said reading coincidence circuit to said output coincidence circuits whereby said output coincidence circuits are energized when the digit in said reading register is equal to the value of the digit in said output digit indicating register whereby the signals from said output coincidence circuits represent the sectors of said recirculating storage means in which digits of the value of the digit in said output digit indicating register are recorded.

5. Apparatus in accordance with claim 4 including an output register coupled to said output coincidence circuits for registering the signals provided by said output coincidence circuits for a period in time at least as long as the time required for all of said output coincidence circuits to be scanned.

6. Apparatus in accordance with claim 5 in which card punching apparatus is coupled to said output register whereby the information registered in said output register is stored in the form of a punched card.

7. Apparatus for data processing, including the combination of a recirculating storage means having a plurality of digit storage positions in which digits may be successively recorded, an output register including a plurality of bit storage positions, means for reading out digits successively from the storage means, means responsive to said read-out means for generating a pulse for each digit read out of the storage means of a preselected value, and means synchronized with the reading-out sequence of digits from said storage means for coupling said pulses to successive ones of said plurality of bit storage positions, whereby pulses generated in response to a selected digit are stored in bit positions in said register determined by the location of information positions in the storage means in which corresponding digits are stored.

8. Apparatus for data processing including means for generating in time sequence a plurality of digits in electrically coded form in which different digits have different identifiable electrical forms, means for generating a signal in response to a digit of preselected value derived from said electrically coded digit generating means, a plurality of output circuits, and means for successively coupling each of said output circuits to the output of said preselected digit responsive means in synchronism with the generation of said digits in time sequence, whereby a signal is received at selected output circuits in accordance with the time sequence of preselected digits from said digit generating means.

9. Data processing apparatus comprising storage means for storing a plurality of digits in electrically coded form in a plurality of separated digit storage positions, means for scanning said storage positions sequentially, said scanning means including means for generating an output signal in response to stored digits of a predetermined value, means synchronized with the scanning of the stored digits for successively gating the output signal of the scanning means to a plurality of different outputs in synchronism with the scanning of successive digits in the storage means, whereby a particular output is energized at a particular time in response to the time sequence of and value of a particular digit stored in the storage means.

References Cited in the file of this patent

UNITED STATES PATENTS

| | | |
|---|---|---|
| 2,540,654 | Cohen | Feb. 6, 1951 |
| 2,614,169 | Cohen | Oct. 14, 1952 |
| 2,702,380 | Brustman | Feb. 15, 1955 |
| 2,708,267 | Weidenhammer | May 10, 1955 |
| 2,718,356 | Burrell | Sept. 20, 1955 |